(12) United States Patent
Lee et al.

(10) Patent No.: US 12,222,315 B2
(45) Date of Patent: Feb. 11, 2025

(54) METHOD OF SENSING ON A FET-TYPE GAS SENSOR USING CHARGE STORAGE ENGINEERING EFFECT

(71) Applicant: Seoul National University R&DB FOUNDATION, Seoul (KR)

(72) Inventors: Jong-Ho Lee, Seoul (KR); Won-Jun Shin, Seoul (KR)

(73) Assignee: SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 526 days.

(21) Appl. No.: 17/736,988

(22) Filed: May 4, 2022

(65) Prior Publication Data

US 2022/0381727 A1 Dec. 1, 2022

(30) Foreign Application Priority Data

May 25, 2021 (KR) .................. 10-2021-0067172

(51) Int. Cl.
*G01N 27/414* (2006.01)
(52) U.S. Cl.
CPC ................................. *G01N 27/4143* (2013.01)
(58) Field of Classification Search
CPC ........... G01N 27/4141; G01N 27/4143; G01N 33/0047; H10K 10/488; H10K 2010/00; H10K 85/00
See application file for complete search history.

(56) References Cited

U.S. PATENT DOCUMENTS

2017/0350853 A1* 12/2017 Lee ................... G01N 27/002

FOREIGN PATENT DOCUMENTS

| KR | 20160037149 | 4/2016 |
| KR | 20170137641 | 12/2017 |
| KR | 20200080481 | 7/2020 |

OTHER PUBLICATIONS

Shin et al., Effect of charge storage engineering on the NO2 gas sensing properties of a WO3 FET-type gas sensor with a horizontal floating-gate, Nanoscale, 2021, vol. 13, pp. 9009-9017.
Shin et al., Efficient Improvement of Sensing Performance Using Charge Storage Engineering in Low Noise FET-type Gas Sensors, 2020 IEEE International Electron Devices Meeting.

* cited by examiner

*Primary Examiner* — Gurpreet Kaur
(74) *Attorney, Agent, or Firm* — CANTOR COLBURN LLP

(57) ABSTRACT

Provided is a sensing method of a FET-type sensor using electric charge storage engineering. The sensing method comprises the following steps to improve reactivity and selectivity to a gas to be sensed: (a) applying a preset erase voltage (Erase bias) or program voltage (Program bias) to the control gate according to the type of gas to be sensed to change a threshold voltage of the FET transducer and control the charge at an interface between the passivation layer and the sensing material layer; and (b) in the recovery phase where the gas detection reaction is terminated and the original state is returned, applying a pre-bias greater or less than a read voltage to the control gate according to the type of gas detected, and then applying the read voltage to the drain and the source of the FET transducer to increase the desorption rate of the detected gas.

9 Claims, 5 Drawing Sheets

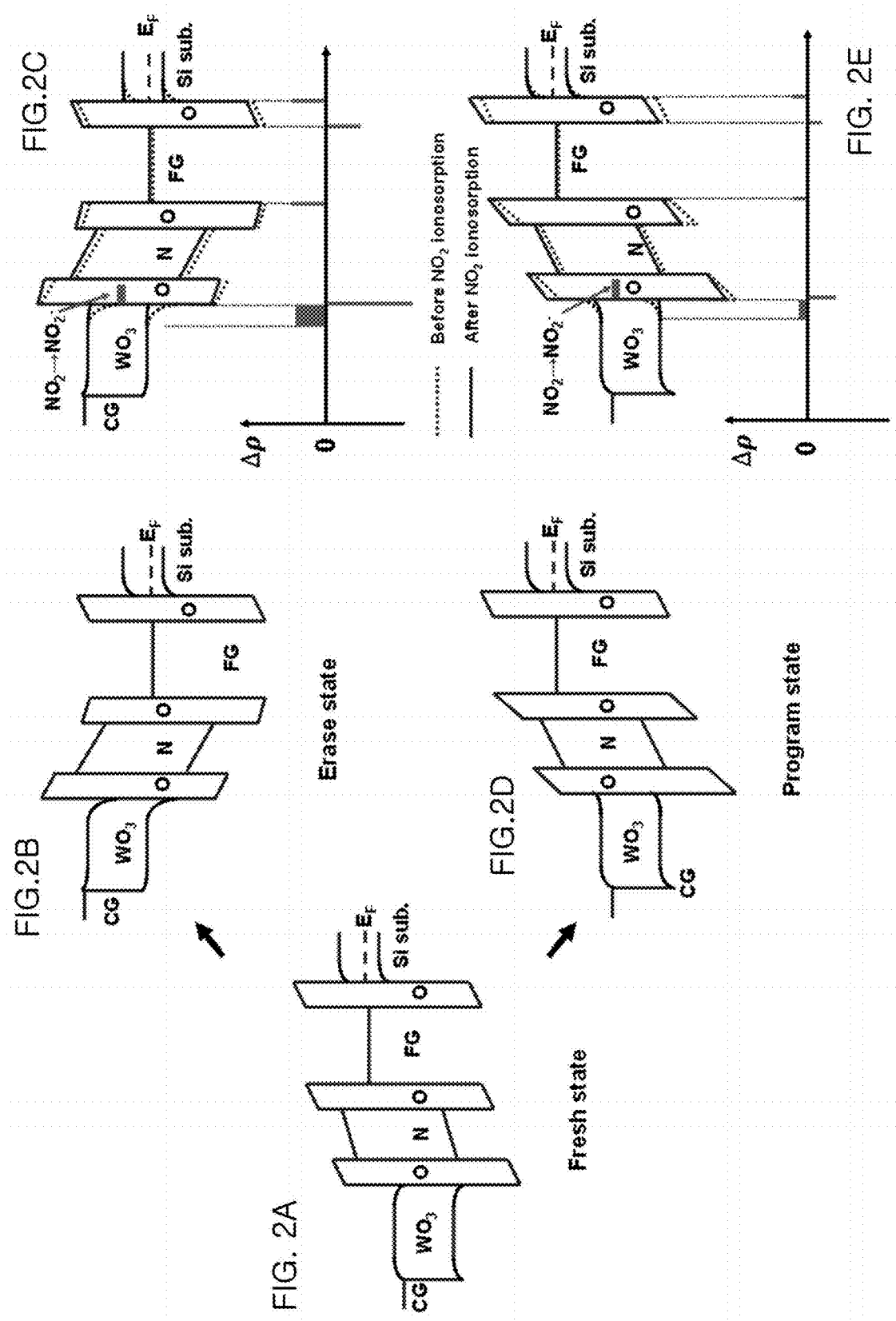

METHOD OF SENSING ON A FET-TYPE GAS SENSOR USING CHARGE STORAGE ENGINEERING EFFECT

TECHNICAL FIELD

The present invention relates to a method of sensing on a FET-type gas sensor with a horizontal floating gate, and more particularly to a sensing method that can improve the response and recovery characteristics, sensitivity and selectivity of the FET-type gas sensor with a horizontal floating gate by using charge storage engineering.

BACKGROUND ART

Recently, in the era of the Internet of Things, various types of sensors are being developed and used. Among them, the gas sensor plays an essential role in minimizing or preventing damage caused by air pollution, and the demand for it is increasing in new technology fields such as the medical field, food, construction, and security industry. For example, a gas sensor for diagnosing lung cancer provides real-time information by analyzing a patient's exhalation, and a gas sensor for detecting food spoilage plays a key role in maintaining the quality and freshness of food by detecting gas generated during spoilage. According to this increase in demand, the global gas sensor market is rapidly growing, and optical, electrical, chemical, and semiconductor-based gas sensors are being researched and developed in various ways.

On the other hand, the optical sensor has an advantage of having a fast response and excellent selectivity because it directly detects the physical properties of gas molecules such as the absorption rate at a specific wavelength of the light source, whereas it has a disadvantage in that the size of the sensor is very large and manufacturing cost is high. The electrochemical sensor has a sensing mechanism for detecting a target gas by detecting a signal that changes through a reduction or oxidation reaction at a cathode or an anode in contact with an electrolyte. The electrochemical sensor has an advantage of having relatively good selectivity and high reactivity even to a gas at a low concentration of ppm or less, but has a disadvantage in that the reaction time is slow and it is greatly affected by humidity.

In the case of semiconductor-based sensors, metal oxides are used as sensing materials, and various sensor platforms such as resistors and FETs exist. The semiconductor-based sensor has advantages in that it is smaller in size and consumes less power compared to the above-described optical sensor and electrochemical sensor, and that many sensors can be manufactured at a low process price. Among the semiconductor-based sensors, the resistive sensor has a very simple structure in which a metal oxide semiconductor is deposited on a metal electrode, so the process is simple and a large amount of sensors can be produced at a low price, while the sensing material is used as a path for the output signal, thus the noise of the sensor signal is very large and there is a limit in reliability and durability. On the other hand, in the FET-type sensor, since the sensing material and the channel of the FET are separated, the noise can be reduced and reliability and durability can be improved. Accordingly, various technologies for improving the sensing characteristics of the FET-type sensor are being researched and developed.

Conventionally, in order to improve the sensing characteristics of a semiconductor-based gas sensor, it has been focused on modifying a sensing material. A metal oxide used as a sensing material for a semiconductor-based sensor can change its structure through various processes. As the structure of the metal oxide changes, the sensing characteristics change. Since nanostructures among the structures of metal oxides have a large surface area capable of reacting with gases, conventional technologies have proposed various nanostructures such as nanotubes, nanodots, nanospheres, and nanosheet hollow spheres. However, in the case of a sensing material having a nanostructure, there is a problem in reliability and durability, and there is a problem in that noise of a sensor signal increases according to a change to a nanostructure. Accordingly, although the semiconductor-based gas sensor can improve its reactivity by adopting a nanostructure, additional problems such as the decrease of durability and reliability, and the increase of the noise occur.

In addition, when a metal oxide is used as a sensing material for a semiconductor-based sensor, a problem of cross-sensing occurs because it reacts with many types of oxidation/reduction gases. In order to solve this problem, techniques for improving the selectivity of the sensor have been reported, and most have adopted a method of doping or loading a metal oxide semiconductor with a catalyst that only improves reaction with a specific gas, such as noble metal or graphene. However, in consideration of compatibility with the CMOS fabricating process, a very high annealing temperature required in the doping or loading process is problematic in terms of heat consumption cost. In addition, the process of doping or loading various catalysts in order to detect each target gas causes a problem of high process cost due to the use of an additional photomask.

Accordingly, the present invention intends to propose a sensing method capable of improving reactivity and selectivity by using a single sensing material without deterioration of durability and reliability in an FET-type gas sensor having a horizontal floating gate.

DISCLOSURE OF THE INVENTION

In order to solve the above problems, the present invention aims to provide a sensing method of a FET-type gas sensor capable of improving the sensing characteristics of a FET-type gas sensor with a horizontal floating gate by using charge storage engineering.

In one aspect of the present invention, there is provided a sensing method of a FET-type sensor comprising a FET transducer with a horizontal floating gate, a passivation layer provided on at least an upper portion of the FET transducer, a control gate provided on a portion of the passivation layer spaced apart from the floating gate to face the floating gate, and a sensing material layer provided on a part of the control gate facing the floating gate, a region between the control gate and the floating gate, and a part of an upper portion of the passivation layer provided on the floating gate, which comprises the following step to improve or decrease reactivity to a gas to be sensed: (a) applying a erase voltage (Erase bias) or a program voltage (Program bias) predetermined according to the type of gas to be sensed to the control gate to change a threshold voltage of the FET transducer and control the charge at an interface between the passivation layer provided on the floating gate and the sensing material layer; and (b) in the recovery phase where the gas detection reaction is terminated and the original state is returned, applying a pre-bias greater or less than a read voltage according to the type of gas detected to the control gate, and then applying the read voltage to the drain and the source of the FET transducer to increase the desorption rate of the detected gas.

In the sensing method of the FET-type sensor according to the present invention, preferably the step (a) comprises the following step: (a1) when the gas to be detected is an oxidizing gas, applying a preset erase voltage (Erase bias) to the control gate and storing holes in the horizontal floating gate of the FET transducer to improve the reaction characteristics to the oxidizing gas; or (a2) when the gas to be detected is a reducing gas, applying a preset program voltage (Program bias) to the control gate and storing electrons in the horizontal floating gate of the FET transducer to improve the reaction characteristics to the reducing gas.

In the sensing method of the FET-type sensor according to the present invention, preferably the step (a) comprises the following step: (a1) when the gas to be detected is an oxidizing gas, applying a preset program voltage (Program bias) to the control gate and storing electrons in the horizontal floating gate of the FET transducer to reduce the reaction characteristics to the oxidizing gas; or (a2) when the gas to be detected is a reducing gas, applying a preset erase voltage (Erase bias) to the control gate and storing holes in the horizontal floating gate of the FET transducer to reduce the reaction characteristics to the reducing gas.

In the sensing method of the FET-type sensor according to the present invention, preferably the step (b) comprises the following step to improve recovery characteristics: (b1) in the recovery phase where the detection reaction of the oxidizing gas is terminated and the original state is returned, applying a positive (+) pre-bias greater than a read voltage to the control gate, and then applying the read voltage to the drain and the source of the FET transducer to increase the desorption rate of the sensed oxidizing gas; or (b2) in the recovery stage where the detection reaction of the reducing gas is terminated and the original state is returned, applying a negative (−) pre-bias smaller than a read voltage to the control gate, and then applying the read voltage to the drain and the source of the FET transducer to increase the desorption rate for the sensed reducing gas.

In the sensing method of the FET-type sensor according to the present invention, preferably the sensing method may be applied to detect a target gas in an FET-type sensor further comprising a micro heater, more preferably the sensing method may be applied to detect a target gas in a sensor array in which a plurality of FET-type sensors further including the micro-heater are disposed.

The FET-type sensor according to the present invention can improve the selectivity of the sensor by utilizing the response characteristics that change according to the program/erase state of the FET transducer. Unlike conventional techniques that use various sensing materials to improve selectivity, the FET-type sensor according to the present invention can improve the selectivity for oxidation/reduction gas by changing the program/erase state of the FET transducer used as the sensor platform even using the same sensing material.

In addition, the FET-type sensor having a horizontal floating gate according to the present invention increases the desorption rate of oxidizing gas by applying a pre-bias greater than the read voltage to the control gate in the recovery stage of returning to the original state after terminating the gas reaction, thereby improving the recovery characteristics. Conversely, the FET-type sensor according to the present invention increases the desorption rate for the reducing gas by applying a pre-bias smaller than the read voltage to the control gate, thereby improving the recovery characteristics.

Therefore, when the FET-type sensor having a horizontal floating gate according to the present invention detects an oxidizing gas, the FET transducer is placed in the erase state and a pre-bias greater than the read voltage is applied to the control gate in the recovery phase. Thereby, it is possible to optimize the sensing characteristics for the oxidizing gas. In addition, when the FET-type sensor having a horizontal floating gate according to the present invention detects a reducing gas, the FET transducer is placed in the program state and a pre-bias smaller than the read voltage is applied to the control gate in the recovery phase. Thereby, it is possible to optimize the sensing characteristics for the reducing gas.

In addition, since the FET transducer of the FET-type sensor according to the present invention has excellent retention characteristics, it is possible to realize charge storage engineering without degrading the reliability and durability of the sensor through one program/erase operation.

In addition, in the FET sensor according to the present invention, unlike a conventional resistance sensor in which a sensing material is used as an electrical path of an output signal, the sensing material and the channel of the FET transducer are separated, so that the noise level is very small due to structural characteristics. Since the p-type FET transducer fabricated on the N-type substrate has a buried channel structure, it is not affected by noise generated by carrier trapping/detrapping at the interface between the gate oxide film and the channel. In addition, the FET-type sensor according to the present invention has excellent durability against an increase in noise due to damage to the gate oxide film due to repeatedly performed program/erase operations.

In addition, the FET-type sensor according to the present invention not only improves the reactivity and selectivity through optimized charge storage engineering, but also improves the signal-to-noise ratio because there is no additional noise increase.

BRIEF DESCRIPTION OF THE DRAWINGS

FIG. 1A is a perspective view, FIG. 1B is a cross-sectional view taken in the A-A direction, and 1C is a Top SEM (Scanning Electron Microscopy) image.

FIGS. 2A to 2E are energy band diagrams for each state of the FET-type sensor in the sensing method of the FET-type sensor according to the preferred embodiment of the present invention. FIG. 2A is for a Fresh state, FIG. 2B is for an Erase state, FIG. 2C is an energy band diagram before and after $NO_2$ Ionosorption in an erase state, FIG. 2D is for a Program state, and FIG. 2E is an energy band diagram before and after $NO_2$ Ionosorption in a program state.

DETAILED DESCRIPTION OF THE INVENTION

Figure 1A:
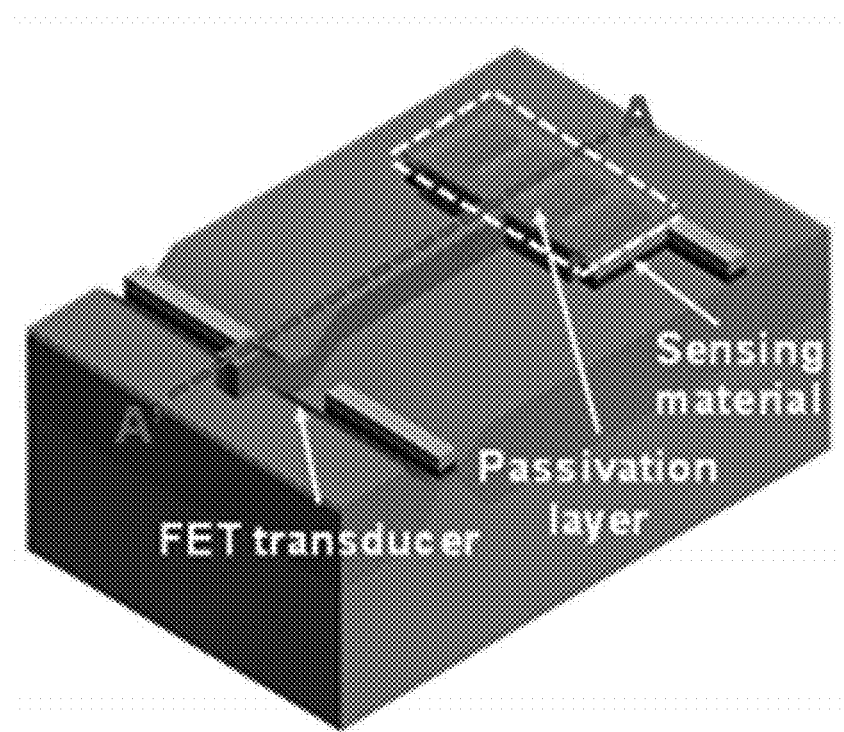
FIGS. 1A to 1C show an FET-type gas sensor having a horizontal floating gate to which a sensing method according to the present invention is applied.
Figure 1B:
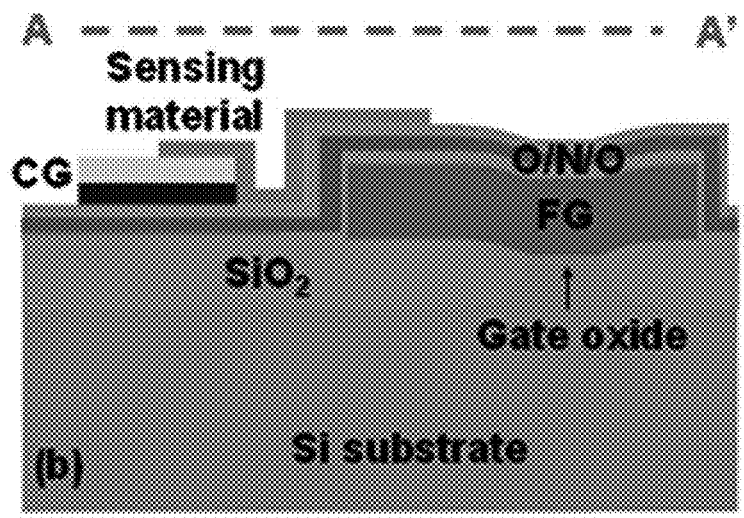
Figure 1C:
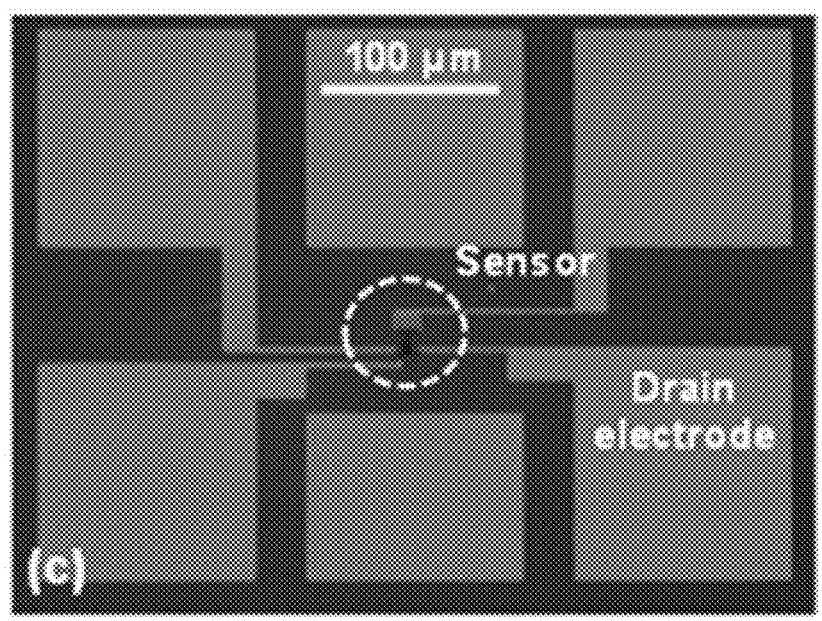

Hereinafter, a sensing method of a FET-type gas sensor having a horizontal floating gate according to a preferred embodiment of the present invention will be described in detail with reference to the accompanying drawings. First, the structure of the FET-type gas sensor having a horizontal floating gate to which the sensing method according to the present invention is applied will be described. FIGS. 1A to 1C show an FET-type gas sensor having a horizontal floating gate to which a sensing method according to the present invention is applied. FIG. 1A is a perspective view, FIG. 1B is a cross-sectional view taken in the A-A direction, and FIG. 1C is a Top SEM (Scanning electron microscopy) image.

Referring to FIGS. 1A to 1C, the FET-type gas sensor 1 with a horizontal floating gate includes a FET transducer having a control gate, a passivation layer, a sensing material layer and a floating gate. The passivation layer is formed in an ONO structure in which $SiO_2$, $Si_3N_4$, and $SiO_2$ are sequentially stacked on a floating gate, and serves to protect the FET transducer from contamination that may occur during a sensing material deposition process or a subsequent gas sensing process. In the sensing method of the FET sensor according to the present invention, when an oxidizing gas is sensed, an erase voltage is applied to the control gate so that the FET transducer is in an erase state, thereby improving the reaction characteristics to the oxidizing gas, and when a reducing gas is sensed, a program bias is applied to the control gate so that the FET transducer is in a program state, thereby improving the reaction characteristics to the reducing gas.

As described above, in the sensing method of the FET-type sensor according to the present invention, a preset program voltage or a preset erase voltage is applied to the control gate of the FET-type sensor according to the type of gas to be sensed, thereby controlling the type and the amount of carriers stored in the floating gate. Through such charge storage engineering, it is possible to change the threshold voltage of the FET transducer used as the platform of the FET-type sensor. In addition, it is possible to change the distribution of carriers existing in the sensing material of the sensor through the above-described charge storage engineering.

For example, when an erase voltage is applied to the control gate, holes existing in the channel of the FET transducer are tunneled to the floating gate, thereby changing the threshold voltage. At the same time, the amount of electrons existing at the interface between the sensing material layer and the passivation layer increases due to the holes stored in the floating gate. As the amount of electrons at the interface increases, the reaction to the oxidizing gas is promoted, and as a result, the reactivity and the reaction rate are improved. The oxidizing gas includes $NO_2$, $O_2$, and the like. On the other hand, when a program voltage is applied to the control gate, the reduced amount of electrons in the sensing material due to electrons stored in the floating gate improves the reaction characteristics to the reducing gas. The reducing gas includes $H_2S$, CO, and the like.

FIGS. 2A to 2E are energy band diagrams for each state of the FET-type sensor in the sensing method of the FET-type sensor according to the preferred embodiment of the present invention. FIG. 2A is for a Fresh state, FIG. 2B is for an Erase state, FIG. 2C is an energy band diagram before and after $NO_2$ Ionosorption in an erase state, FIG. 2D is for a Program state, and FIG. 2E is an energy band diagram before and after $NO_2$ Ionosorption in a program state. In FIGS. 2C and 2E, the parameter of Δρ represents the variation of charge density.

Figure 3:
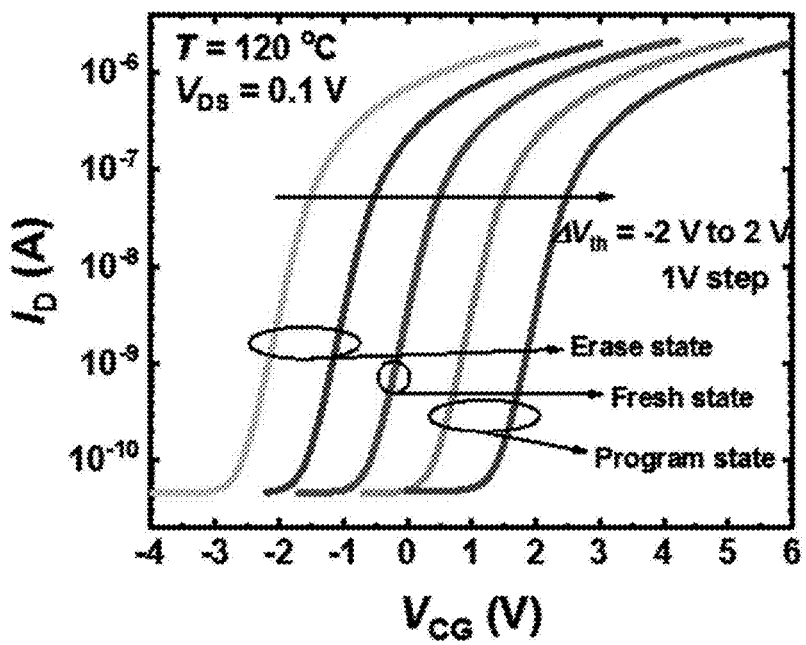
FIG. 3 is a graph showing $I_D$-$V_{CG}$ relationship according to the threshold voltage change (ΔVth) by the PIE operation of the FET-type sensor in the sensing method of the FET-type sensor according to the preferred embodiment of the present invention.

FIG. 3 is a graph showing the relation of $I_D$ and $V_{CG}$ according to the threshold voltage change (ΔVth) by the P/E operation of the FET-type sensor in the sensing method of the FET-type sensor according to the preferred embodiment of the present invention.

Referring to FIG. 3, by applying a program bias ($V_{PGM}$) and an erase bias ($V_{ERS}$) to the control gate while the source and the drain maintain a ground state, carriers for Fowler-Nordheim (F-N) tunneling can be supplied. During the P/E operation, electrons or holes are injected from the channel of the FET transducer into the floating gate FG by F-N tunneling, thereby causing an increase or decrease of Vth, respectively.

Figure 4:
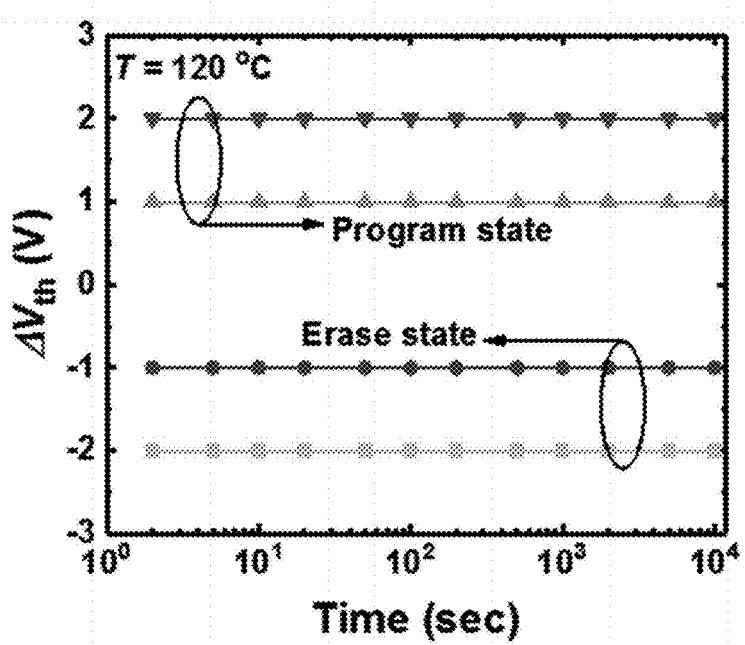
FIG. 4 is a graph showing the retention characteristic up to $10^4$ sec in the sensing method of the FET-type sensor according to a preferred embodiment of the present invention.

FIG. 4 is a graph showing the retention characteristic up to $10^4$ sec in the sensing method of the FET-type sensor according to a preferred embodiment of the present invention. Referring to FIG. 4, it can be seen that the change in Vth is negligible up to $10^4$ sec and shows a very good retention performance.

Figure 5:
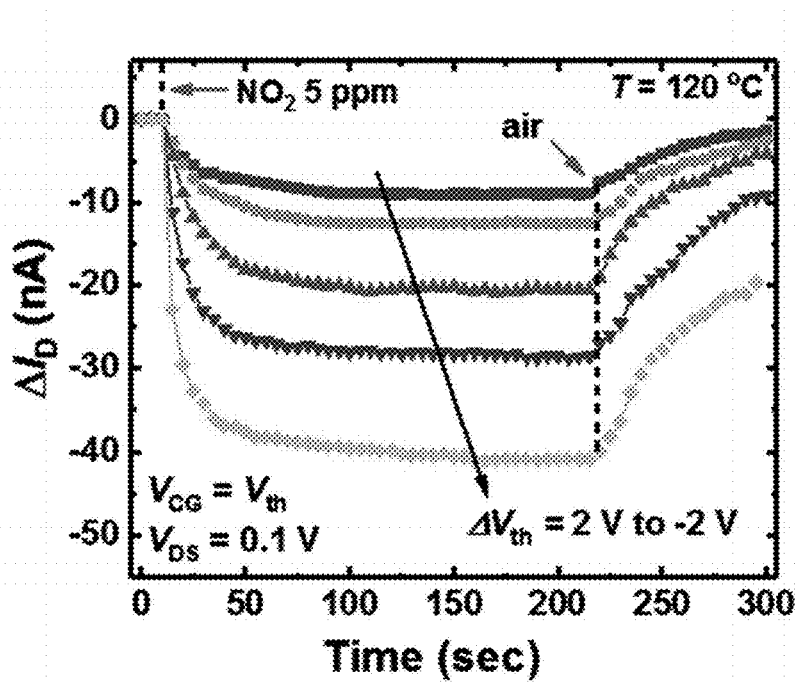
FIG. 5 is a graph showing the $\Delta I_D$ operation according to the parameter of ΔVth at a fixed $NO_2$ concentration of 5 ppm in the sensing method of the FET-type sensor according to the preferred embodiment of the present invention.

FIG. 5 is a graph showing the $\Delta I_D$ operation according to the parameter of ΔVth at a fixed $NO_2$ concentration of 5 ppm in the sensing method of the FET-type sensor according to the preferred embodiment of the present invention.

In the sensing method of the FET-type sensor according to the present invention, in the recovery phase where the detection reaction of the oxidizing gas is terminated and the original state is returned, a preset pre-bias ($V_{pre}$) greater than a read voltage ($V_{rCG}$) is applied to the control gate, and then the read voltage ($V_{rDS}$) is applied to the source and the drain of the FET transducer to increase the desorption rate of the oxidizing gas, thereby improving the recovery characteristic. On the other hand, in the recovery stage where the detection reaction of the reducing gas is terminated and the original state is returned, a pre-bias ($V_{pre}$) smaller than a read voltage ($V_{rCG}$) is applied to the control gate, and then the read voltage ($V_{rDS}$) is applied to the source and the drain of the FET transducer to increase the desorption rate for the reducing gas, thereby improving the recovery characteristic.

Figure 6:
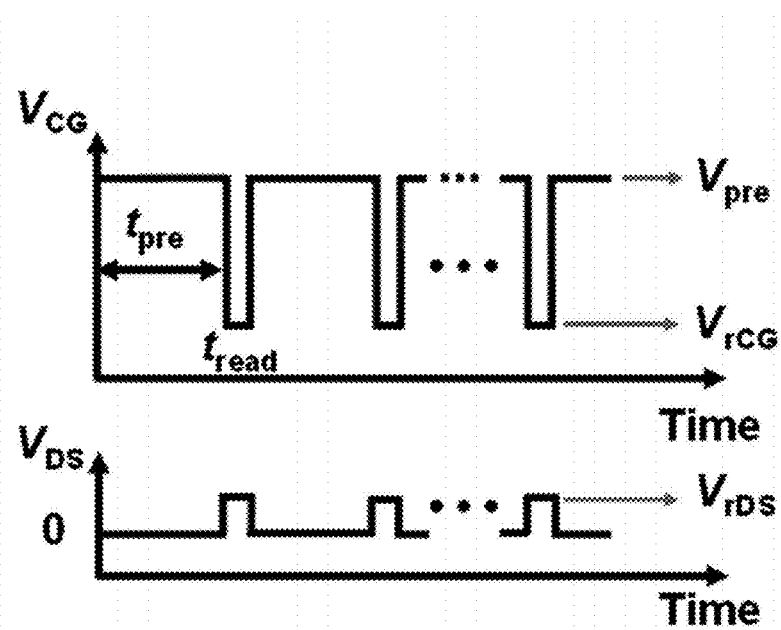
FIG. 6 is a pre-bias pulse scheme used to improve the recovery rate of the sensor with respect to $NO_2$, which is an oxidizing gas, in the sensing method of the FET-type sensor according to the preferred embodiment of the present invention.

FIG. 6 is a pre-bias pulse scheme used to improve the recovery rate of the sensor with respect to $NO_2$, which is an oxidizing gas, in the sensing method of the FET-type sensor according to the preferred embodiment of the present invention.

Therefore, when the FET-type sensor having a horizontal floating gate according to the present invention detects an oxidizing gas, the FET transducer is placed in the erase state, and a preset pre-bias ($V_{pre}$) greater than the read voltage ($V_{rCG}$) is applied to the control gate in the recovery step, thereby optimizing the sensing properties for the oxidizing gas. In addition, when the FET-type sensor having a horizontal floating gate according to the present invention detects a reducing gas, the FET transducer is placed in the program state and a preset pre-bias ($V_{pre}$) smaller than the read voltage ($V_{rCG}$) is applied to the control gate in the recovery step, thereby optimizing the sensing properties for the reducing gas.

On the other hand, the sensing method of the FET-type sensor according to the present invention described above may be applied to detect a target gas in an FET-type sensor further including a micro-heater, or to detect a target gas in a sensor array in which a plurality of FET-type sensors further including the micro-heater are disposed.

In the above, the present invention has been mainly described with respect to preferred embodiments thereof, but this is merely an example and does not limit the scope of the present invention. Those of ordinary skill in the art to which the present invention pertains will appreciate that various modifications and applications not exemplified herein are possible without departing from the essential characteristics of the present invention. And, the differences related to these modifications and applications should be interpreted as being included in the scope of the present invention defined in the appended claims.

What is claimed is:

1. A sensing method of a FET-type sensor comprising a FET transducer with a horizontal floating gate, a passivation layer provided on at least an upper portion of the FET transducer, a control gate provided on a portion of the passivation layer spaced apart from the floating gate to face the floating gate, and a sensing material layer provided on a part of the control gate facing the floating gate, a region between the control gate and the floating gate, and a part of an upper portion of the passivation layer provided on the floating gate, which comprises the following step to improve or decrease reactivity to a gas to be sensed:
    (a) applying a preset erase voltage (Erase bias) or program voltage (Program bias) to the control gate according to the type of gas to be sensed to change a threshold voltage of the FET transducer and control the charge at an interface between the passivation layer located on the floating gate and the sensing material layer.

2. The sensing method of the FET-type sensor according to claim 1, wherein the step (a) comprises the following step:
    (a1) when the gas to be detected is an oxidizing gas, applying a preset erase voltage (Erase bias) to the control gate to store holes in the horizontal floating gate of the FET transducer and improve the reaction characteristics to the oxidizing gas; or
    (a2) when the gas to be detected is a reducing gas, applying a preset program voltage (Program bias) to the control gate to store electrons in the horizontal floating gate of the FET transducer and improve the reaction characteristics to the reducing gas.

3. The sensing method of the FET-type sensor according to claim 1, wherein the step (a) comprises the following step:
    (a1) when the gas to be detected is an oxidizing gas, applying a preset program voltage (Program bias) to the control gate to store electrons in the horizontal floating gate of the FET transducer and reduce the reaction characteristics to the oxidizing gas; or
    (a2) when the gas to be detected is a reducing gas, applying a preset erase voltage (Erase bias) to the control gate to store holes in the horizontal floating gate of the FET transducer and reduce the reaction characteristics to the reducing gas.

4. The sensing method of the FET-type sensor according to claim 1, wherein the sensing method further comprises the following step:
    (b) in the recovery phase where the gas detection reaction is terminated and the original state is returned, applying a pre-bias greater or less than a read voltage to the control gate according to the type of gas detected, and then applying the read voltage to a drain and a source of the FET transducer to increase the desorption rate of the detected gas.

5. The sensing method of the FET-type sensor according to claim 4, wherein the step (b) comprises the following step to improve recovery characteristics:
    (b1) in the recovery phase where the detection reaction of the oxidizing gas is terminated and the original state is returned, applying a positive (+) pre-bias greater than a read voltage to the control gate, and then applying the read voltage to the drain and the source of the FET transducer to increase the desorption rate of the sensed oxidizing gas; or
    (b2) in the recovery stage where the detection reaction of the reducing gas is terminated and the original state is returned, applying a negative (−) pre-bias smaller than a read voltage to the control gate, and then applying the read voltage to the drain and the source of the FET transducer to increase the desorption rate for the sensed reducing gas.

6. The sensing method of the FET-type sensor according to claim 1, wherein the sensing method comprises the following steps:
    (a) when the gas to be detected is an oxidizing gas, applying a preset erase voltage (Erase bias) to the control gate to store holes in the horizontal floating gate of the FET transducer and improve the reaction characteristics to the oxidizing gas; and
    (b) in the recovery stage where the detection reaction of the oxidizing gas is terminated and the original state is returned, applying a pre-bias greater than a read voltage to the control gate, and then applying the read voltage to a drain and a source of the FET transducer to increase the desorption rate of the sensed oxidizing gas.

7. The sensing method of the FET-type sensor according to claim 1, wherein the sensing method comprises the following steps:
    (a) when the gas to be detected is a reducing gas, applying a preset program voltage (Program bias) to the control gate to store electrons in the horizontal floating gate of the FET transducer and improve the reaction characteristics to the reducing gas; and
    (b) in the recovery stage where the detection reaction of the reducing gas is terminated and the original state is returned, applying a pre-bias smaller than a read voltage to the control gate, and then applying the read voltage to a drain and a source of the FET transducer to increase the desorption rate for the sensed reducing gas.

8. The sensing method of the FET-type sensor according to claim 1, wherein the sensing method is applied to detect a target gas in an FET-type sensor further comprising a micro heater.

9. The sensing method of the FET-type sensor according to claim 8, wherein the sensing method is applied to detect a target gas in a sensor array in which a plurality of FET-type sensors further including the micro-heater are disposed.

* * * * *